United States Patent
McKee et al.

(10) Patent No.: US 6,322,696 B1
(45) Date of Patent: Nov. 27, 2001

(54) INLET FILTER FOR HIGH PRESSURE SPRAYER

(75) Inventors: Sheila S. McKee, St. Paul; Mark B. Kirschenman, Center City, both of MN (US)

(73) Assignee: GP Companies, Inc., Mendota Heights, MN (US)

( * ) Notice: Subject to any disclaimer, the term of this patent is extended or adjusted under 35 U.S.C. 154(b) by 0 days.

(21) Appl. No.: 09/512,441

(22) Filed: Feb. 25, 2000

(Under 37 CFR 1.47)

(51) Int. Cl.[7] .................................................. B01D 35/28
(52) U.S. Cl. ........................... 210/232; 210/456; 210/449; 210/446; 210/450; 210/94
(58) Field of Search .................. 210/94, 95, 232, 210/435, 446, 449, 450, 456, 460, 442, 159; 222/159

(56) References Cited

U.S. PATENT DOCUMENTS

| | | |
|---|---|---|
| 1,638,066 * | 8/1927 | Smythe . |
| 1,866,970 * | 7/1932 | Garland et al. . |
| 3,369,665 * | 2/1968 | Paulson . |
| 3,581,752 | 6/1971 | Schoepe et al. . |
| 4,192,344 | 3/1980 | Masuys et al. . |
| 4,300,592 | 11/1981 | Hartley . |
| 4,846,218 | 7/1989 | Upchurch . |
| 5,330,649 | 7/1994 | Hafner . |
| 5,406,974 | 4/1995 | Griswold . |
| 5,860,447 | 1/1999 | Chu . |
| 5,875,815 | 3/1999 | Ungrecht et al. . |
| 5,921,475 | 7/1999 | DeVriese et al. . |

* cited by examiner

Primary Examiner—Joseph W. Drodge
Assistant Examiner—Terry K. Cecil
(74) Attorney, Agent, or Firm—Oppenheimer Wolff & Donnelly LLP

(57) ABSTRACT

An inlet filter includes a cap and a body that are securely connectable to one another. Once connected, these elements form the structural backbone of the filter. Disposed between the cap and body is a transparent cover that allows one to view a filtering screen located within. Thus, the inlet filter serves to remove particulate matter from a supply of water prior to supplying it to a high pressure sprayer or similar device. As the filtering screen becomes clogged, its status can be visually determined. Thus a clear and readily apparent indication is presented as to when the filter needs to be cleaned or replaced.

27 Claims, 2 Drawing Sheets

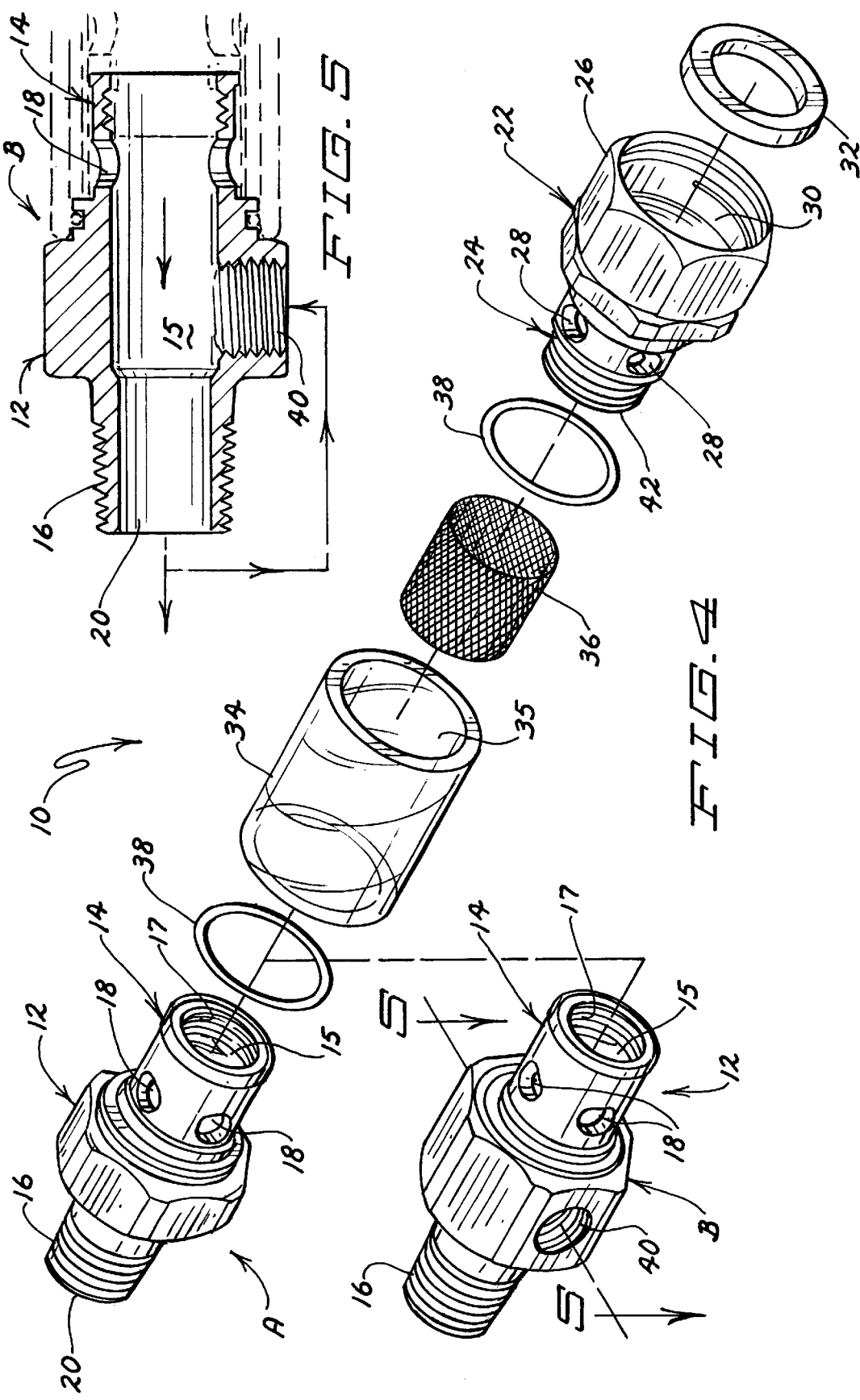

INLET FILTER FOR HIGH PRESSURE SPRAYER

BACKGROUND OF THE INVENTION

1. Field of the Invention

The present invention relates generally to filters. More specifically, the present invention is an inlet filter for a high pressure sprayer.

2. Description of the Related Art

There are a wide variety of mechanical devices that require a constant fluid input from a bulk supply. For example, high pressure sprayers are used for many applications. Such sprayers take water (usually) from a low pressure source and pass it through a pump, where a dramatic increase in fluid pressure is achieved. Subsequently, the pressurized water is controllably and selectively dispensed from an appropriate wand or nozzle.

The various components of these sprayers are generally manufactured to high tolerances from a durable material. In use, various valves and connectors are actuated to initiate and then cease the flow of high pressure fluid. This cycling in and of itself produces significant stress on the components of the sprayer and the pump.

Two competing interests exist when designing high pressure sprayers. The components must be strong enough to endure the stresses imposed during use. In addition, the components must be manufactured to interact with one another with a great degree of precision. Often these interacting components are fairly small and intricate. Even the larger components will only have a small margin of acceptable error.

Many manufactures have successfully designed sprayers that will work properly under such conditions. The complicating factor during the actual use of these sprayers is that the water supply is normally unfiltered. For example, in many home and light commercial applications, a garden hose is connected to the inlet of the sprayer. Thus, the water entering the sprayer can be contaminated with varying amounts of dirt or other particles. These contaminates can either be introduced through contamination of the garden hose during other applications, or they are introduced to the water at its source (or through the interconnecting piping) and carried throughout. In any event, a fair amount of contaminates are expected to be introduced to the sprayer and the pump from the water.

As discussed above, with the high levels of pressure involved, the movement of the components, and the required degree of precision in their interaction, it should be readily apparent why the introduction of particulate matter into this system could be destructive. At a minimum, debris may simply clog a nozzle, a port or other orifice. While not necessarily damaging, the system will have to be cleaned, requiring a certain amount of disassembly and down time. More seriously, debris may enter and damage various components in the pump or unloader. Once damaged, these parts will have to be replaced and could be very costly. More specifically, debris in the system can hold open regulation valves in the unloader or regulator or valves within the pump itself. This can cause the system to stop working altogether or it could simply cause it to perform poorly. In addition, such debris will cause these valves and other components to wear prematurely.

In order to avoid the damage caused by contaminates, it has become standard practice to place a filtering device on the inlet side of the pump. Water being introduced into the system is first filtered, removing any particulate material that could otherwise cause damage to the various components. This is, of course, an elegantly simple solution to the above problem. The one drawback is that any given filter will have a limited useful life span. As the filter becomes clogged with particulate matter, it will reduce the volume of water passing through it. If the volume per unit of time becomes too low, it will adversely affect the performance of the pressure sprayer.

To overcome this problem, the filtering element must be periodically inspected and replaced. Generally, the filtering element will be occluded from view; hence, the entire filter must be detached and taken apart to expose the filtering element. Since variations in the quality of the water will occur as well as variations in the frequency of use, it becomes difficult to predict or estimate when the filter element should be checked and/or replaced. Many times the filter is not inspected until a loss in performance is seen, as some operators do not realize the importance of proper filtration. By this time, damage may have occurred to the pump due to cavitation caused by the lack of adequate flow into the pump. Thus, fairly frequent and time consuming inspections must be performed.

Therefore, there exist a need to provide an inlet filter for a pressure sprayer that can provide a readily apparent indication that the filtering element is in need of replacing, without requiring detachment and disassembly of the filter for inspection.

SUMMARY OF THE INVENTION

The present invention provides a multi-piece inlet filter having a clear, non-load bearing cover. A screen is used as a filtering element and is visible through the clear cover. The durability of the cover is maintained because the cover is a non-load-bearing element. In order to provide an integrated cover that is non-load bearing, the various internal components must provide structural integrity for the whole filter.

In a preferred embodiment, the filter includes a body and a cap, securely inter-connectable to one another. The body includes a threaded portion that is coupleable to the inlet of a sprayer. At an opposite end, the body has a female coupling adapted to receive a male coupling provided on the cap. One or more inlet ports are located on the female coupling and provide access to a fluid passageway within the body. The fluid passageway terminates in an outlet passageway that is ultimately coupled to the inlet of the sprayer. Similarly, the male coupling of the cap is provided with one or more outlet ports that provide access to a fluid passageway within the cap. This fluid passageway runs through a fitting on the cap. The fitting is adapted to receive various common types of water supply fixtures, such as a garden hose.

The screen or filter is slid over the female coupling of the body and entirely covers the various inlet ports. Subsequently, the male coupling of the cap is engaged with the female coupling of the body. The clear cover is disposed between the body and the cap, and is effectively "sandwiched" between them. Appropriate seals are provided so that a fluid tight seal is formed between the cover and the cap and body, respectively. While a fluid tight seal is provided, the cover is a non-load bearing element. As defined herein, non-load bearing means that the cover is not relied on to couple the cap to the body and that the actual coupling of the cap to the body is completely independent of the cover. The cover will be required to withstand any pressure generated from the flow of fluid though it and must do so in a fluid tight manner.

Once properly assembled, a complete fluid passageway is formed. Water is directed into an inlet passageway through the fitting of the cap from a common water supply, such as a garden hose. Water passes through the cap and out of the outlet ports disposed on the male coupling of the cap. At this point, the water is contained within the cover due to the fluid tight seal generated between it and the cap and body. The water is then forced to travel through the screen and then through the inlet ports located on the female coupling of the body. Subsequently, the water passes unencumbered through the body and out of the outlet passageway where it is introduced into the pressure sprayer.

The screen is configured so that the openings in the mesh are smaller than particles that may adversely affect the performance of the sprayer. Thus, as fluid flows from the cap to the body, particulate matter larger than a predetermined size will be precluded from passing through the screen and into the pressure sprayer. Through continued use, the screen will eventually begin to clog. This will be readily apparent by directly viewing the screen through the transparent cover. Once it is determined that the screen needs to be cleaned or replaced, the cap is unscrewed from the body. The screen is then slid off and either cleaned or replaced. The new or cleaned screen is then slid back over the coupling of the body and the inlet filter is reassembled. The filter body does not have to be removed from the pump inlet to clean or replace the screen. In this manner, the inlet filter is cleaned when the filtering element visually shows the need.

In an alternative embodiment, a bypass inlet port has been added to the body, between the body inlet ports and the outlet passageway. In certain pressure sprayers, there will be various bypass functions that direct filtered water somewhere other than the nozzle or wand. For example, the unloader may include a bypass valve. This water must be routed back to the pump inlet. In order to be more efficient, this water can be reintroduced into the sprayer through the inlet filter. Opposite the bypass port a monitoring device such as a pump thermal protector (PTP) can be installed or other inlet component. This simplifies replacement and cleaning of the filter screen as the filter body containing the bypass port and PTP does not have to be disturbed, as it can remain attached to the pump inlet during cleaning.

It is an object of the present invention to provide an inlet filter having a transparent cover.

It is another object of the present invention to provide an inlet filter having a non-load bearing transparent cover.

It is yet another object of the present invention to provide an inlet filter having a filtering element viewable from the exterior of the filter.

It is still yet a further object of the present invention to provide an inlet filter having a cap and a body that are inter-connectable and are the load bearing elements of the filter, while a transparent cap is fluidly sealed between the cap and the body.

It is still yet another object of the present invention to provide a filter with a sealed cover wherein the sealing occurs through the use of diametrical seals (i.e. O-Rings) located on an inside diameter.

It is yet still another object of the present invention to provide a filter with a sealed cover wherein the sealing occurs through the use of compressible gasket material located at the ends of the cover.

BRIEF DESCRIPTION OF THE DRAWINGS

FIG. 4 is an exploded perspective view of the components of the inlet filter of the present invention, wherein alternative bodies, A and B are each illustrated.

FIG. 5 is a side sectional view of body B, illustrated in FIG. 4.

DETAILED DESCRIPTION OF PREFERRED EMBODIMENTS

Figure 1:
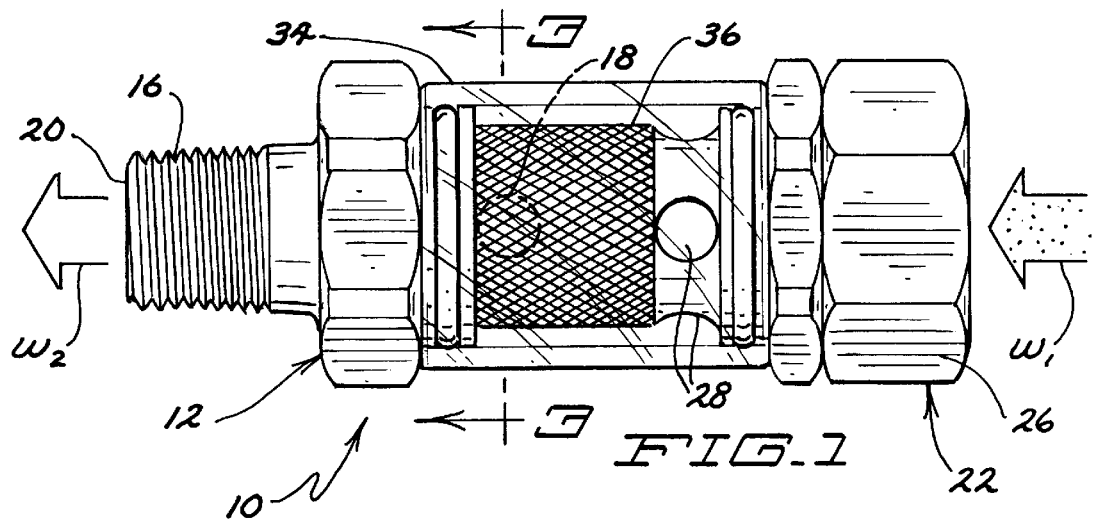
FIG. 1 is a side planar view of an assembled inlet filter according to the teachings of the present invention.

Referring to FIG. 4, a preferred embodiment of an inlet filter according to the teachings of the present invention is shown and generally referred to as 10. Inlet filter 10 includes a body 12 having a female coupling 14 at one end. Female coupling 14 is an elongated cylindrical member having a fluid passageway 15 extending at least partially therethrough and includes at least a partially threaded interior 17. Fluid passageway 15 is shown extending through the whole of body 12.

Disposed about the circumference of female coupling 14 is a plurality of circular body inlet ports 18. Inlet ports 18 fluidly couple the exterior of female coupling 14 to fluid passageway 15. While this embodiment presents four circular inlet ports 18, it is to be understood that any number of ports may be utilized and the ports may be of various sizes and/or shapes. It is desirable to maximize the volume of fluid flow per unit of time through the inlet ports 18 while minimizing any structural degradation that might occur by proving too large or too many inlet ports. At the opposite end of body 12 from female coupling 14, an appropriate attachment mechanism is provided to couple inlet filter 10 to the desired pressure sprayer or a similar fluid using device. In this embodiment, a threaded attachment member 16 is provided to accomplish this. Threaded attachment member 16 can be screwed into an inlet of the desired device. Fluid passageway 15 extends through threaded attachment member 16 and will be connected with an appropriate passageway within the device via outlet passageway 20.

A cap 22 is provided and has a fluid passageway 23 extending partially therethrough. Fluid passageway 23 begins with inlet passageway 30 located on the interior of fitting 26. Fitting 26 is configured to receive various common fluid supply connectors, such as the threaded connector of a garden hose. As shown, fitting 26 is threaded to securely receive the connector of a garden hose and includes seal 32 to form fluid tight connection. It is to be understood that fitting 26 can be modified to receive various fluid supply couplings. Opposite from fitting 26, a male coupling 24 is provided. Male coupling 24 is a generally cylindrical member having a plurality of cap outlet ports 28 fluidly connected with fluid passageway 23. As illustrated, male coupling terminates in an externally threaded cylindrical section 42. Male coupling 24 also includes terminus 29, which effectively seals or terminates fluid passageway 23.

Cap 22 is coupleable to body 12. More precisely, male coupling 24 is intended to be securely connected to female coupling 14. As illustrated, these components are provided with complimentary threaded sections so that cap 22 can be screwed into body 12. Various other types of interconnections between cap 22 and body 12 are possible. For example, various quick connects or snap-locks could be utilized. As explained in more detail below, a screen 36 is provided to filter water passing through inlet filter 10. In this embodiment, screen 36 can be replaced or cleaned simply by unscrewing cap 22 from body 12. It is also possible to manufacture inlet filter 10 from less expensive components so that the entire inlet filter 10 can be replaced, rather than just replacing screen 36. Should this be the case, male coupling 24 and female coupling 14 could be connected through various frictional clamping mechanisms, that are not intended to be separated.

Body 12 and cap 22 can be made of various materials including plastics or metal. Most preferably, these components are formed from a durable metal such as brass.

Figure 3:
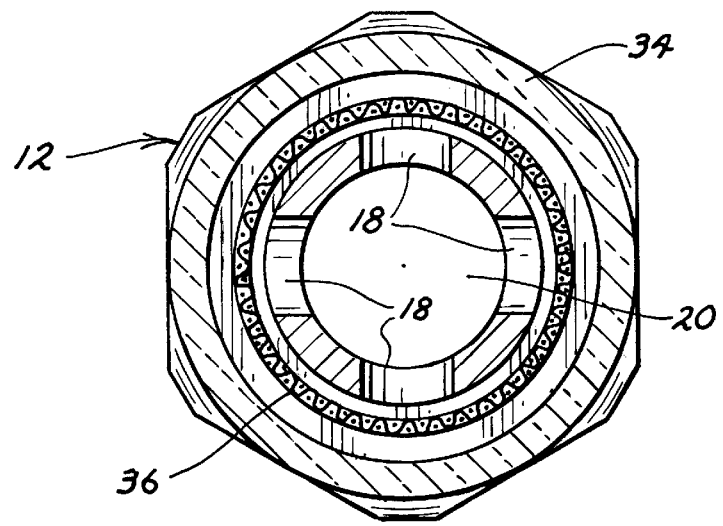
FIG. 3 is a sectional view of the assembled inlet filter illustrated in FIG. 1, and taken through sectional line 3—3.

As shown in FIG. 3, screen 36 is configured to snugly engage female coupling 14 and cover all of the body inlet ports 18. Screen 36 can be fabricated from a wide variety of materials, including plastics or metals. Screen 36 acts as a filtering element and as such, includes a meshed element. The openings in the mesh are selected to be smaller that than smallest particulate element that is acceptably passed into the pressure sprayer or similar device. As such, the specifics of screen 36 will depend largely upon the machine inlet filter 10 will be used on.

A cylindrical cover 34 is also provided. Cover 34 has a hollow interior 35 that is spaced to accommodate portions of female coupling 14, male coupling 24 and screen 36 while still leaving an area of unobstructed space around these elements. Most preferably, cover 34 is transparent allowing screen 36 to be viewed from the exterior of cover 34. In some applications, it may be desirable to partially or wholly occlude cover 36. Cover 36 can be fabricated from any appropriate material, so long as it is suitable to be in contact with the fluid passing though inlet filter 10. Most preferably, cover 36 is fabricated from translucent plastic. Cover 34 is a non-load bearing member. As defined herein, cover 34 is non-load bearing when it is not used to couple cap 22 to body 12. That is, cover 34 is disposed between cap 22 and body 12 in a fluid tight manner and must withstand force applied from the fluid passing through and any normal externally applied forces. However, cover 34 is not relied on to hold the various components of the filter together and can, therefore, be fabricated from lighter gauge materials.

FIG. 4 shows an exploded view of inlet filter 10. To assemble inlet filter 10, a first O-ring 38 is slid over female coupling 14 until it abuts a portion of body 12. Subsequently, screen 36 is slid into position over inlet ports 18 on female coupling 14. A second O-ring 38 is place over male coupling 24 on cap 22. Then, cap 22 is screwed into body 12, with cover 34 disposed between them. As male coupling 24 is tightly screwed into female coupling 14, O-rings 38 form a fluid tight seal between cover 34 and each of body 12 and cap 22. Once assembled, inlet filter 10 appears through cover 34 as shown in FIG. 1.

Figure 2:
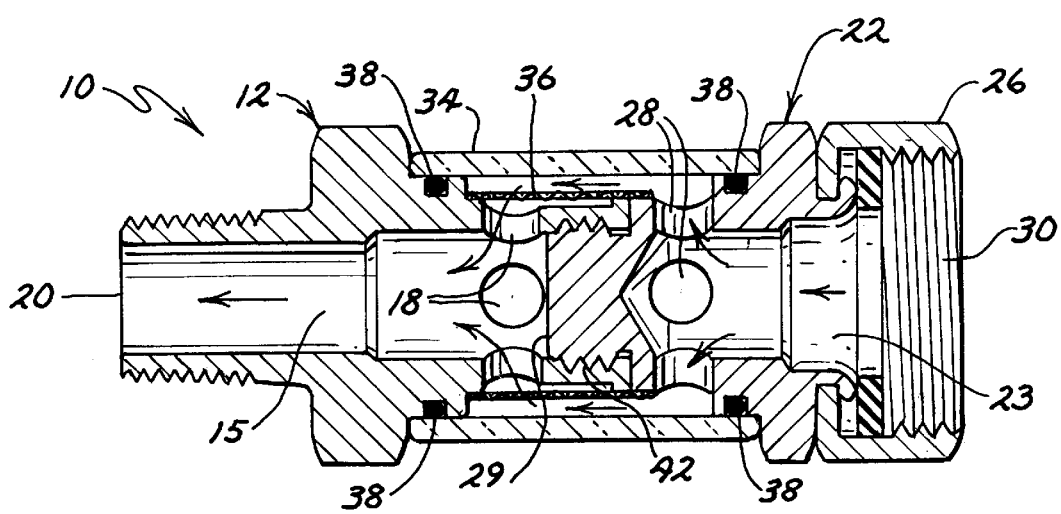
FIG. 2 is a side sectional view of an assembled inlet filter according to the teachings of the present invention.

Referring to FIGS. 1 and 2, the path taken by fluid passing through inlet filter 10 is most clearly shown. In use, fitting 26 is appropriately connected to a supply of water $W_1$, such as a garden hose. Whatever the actual condition of the water being supplied, it is considered unfiltered as it has yet to pass through inlet filter 10. As the fluid passes through inlet passageway 30 it is forced to enter fluid passageway 23 and then exit through one of the cap outlet ports 28. At this point, the fluid is contained by cover 34 and flows through screen 36, where it is filtered. The fluid then enters fluid passageway 15 (within body 12) through one of the body inlet ports 18. The filtered fluid $W_2$ then exits inlet filter 10 through body outlet passageway 20, and subsequently enters a high pressure sprayer or other similar device requiring a filtered fluid input.

As is most clearly illustrated by FIG. 2, the structural integrity of inlet filter 10 is derived exclusively from the interconnection of body 12 with cap 22. Thus, cover 34 is simply held in place by cap 22 and body 12 in a fluid tight manner and is therefore not a load-bearing member. In other words, cover 34 is not used in any way to connect cap 22 to body 12. Cover 34 does function to contain water, however, and must be able to withstand expected water pressures. Without cover 34, inlet filter 10 would not function because fluid would simply be expelled from outlet ports 28, however inlet filter 10 would remain structurally intact. In addition, any tension or forces generated and applied to either body 12 or cap 22 will simply be transmitted to the other load-bearing member and will not adversely affect cover 34. In this manner, cover 34 can be fabricated from a lighter grade material such as plastic, without reducing the overall structural integrity of inlet filter 10.

After a certain number of uses, screen 36 may become clogged with the particulate matter it is filtering from the fluid supply. The operator can visually determine the status of screen 36 by looking through the transparent cover 34. When it is determined that screen 36 has become too encumbered, cap 22 is unthreaded from body 12. Screen 36 can then be cleaned or a new screen can be obtained. In either case, a clean screen 36 is used and inlet filter 10 is reassembled. Alternatively, if cost effective and desired, inlet filter 10 can be replaced in its entirety.

Referring to FIGS. 4 and 5, an alternative embodiment is illustrated. Two substantially similar bodies 12 are shown and designated A and B. Body A is exactly as described above, while body B is the alternative embodiment. While both are illustrated, only one is used at any given time. Referring to body B, a bypass inlet port 40 is in fluid communication with fluid passageway 15. Bypass inlet port 40 can be used to introduce fluid into the sprayer (or similar device) without filtering it. Though only one inlet port 40 is illustrated, it is to be understood that more could be included. One optimal configuration would be to have a second inlet port spread 180° from the illustrated inlet port 40. For example, an unloader valve in some high pressure sprayers will have a bypass valve, that redirects water under various conditions. This bypassed water has already been filtered and reintroducing it into the system through bypass inlet port 40 provides a convenient way to recycle it. The additional ports can also be used for system monitoring devices such as a pump thermal protector. Alternatively, additional inlet ports could be included on cap 22, if it is desired to filter the fluid. This would allow for multiple inputs. In addition, this would allow for the introduction of different fluids into the system. That is, more than one type of fluid could be introduced through inlet filter 10, at the same time. The additional fluids could either be filtered or unfiltered, depending upon the location of that additional inlet port.

Though inlet filter 10 has been described with reference to two specific embodiments, it is to be understood the present invention includes various modifications, which are still considered to be within the scope and spirit of the present invention. For example, cap 22 may be coupled to body 12 through various other mechanisms (some of which are described above), rather than using mating threads. The type of connection is not as important as assuring that cap 22 and body 12 act as the load bearing elements of filter 10, when assembled. Additionally, various other types of filtering elements could be used instead of screen 36 (or positioned differently), so long as the fluid is filtered prior to exiting inlet filter 10.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. An inlet filter, comprising:
   a cap of unitary construction, having a first coupling, and defining an inlet passageway leading into a first fluid passageway limited opposite said inlet passageway by said coupling and operably disposed within the cap fluidly connecting the inlet passageway and an outlet port located in a side wall of said first coupling;
   a body of unitary construction, having a second coupling including an end directly coupleable to an end of the first coupling, and a sidewall defining an inlet port in fluid communication with a second fluid passageway operably disposed within the body and in fluid communication with an outlet passageway;
   a filtering element removably disposed between the inlet port and the outlet port; and
   a cover removably disposed between and fluidly sealed against the body and the cap.

2. The inlet filter of claim 1, wherein the body includes a plurality of inlet ports.

3. The inlet filter of claim 1, wherein the first coupling and the second coupling are mating threaded members.

4. The inlet filter of claim 1 wherein the cap includes a plurality of outlet ports.

5. The inlet filter of claim 1 wherein the filtering element is a screen.

6. The inlet filter of claim 1, further including:
   a first O-ring operably disposed between the cover and the body to form a fluid tight seal therebetween; and
   a second O-ring operably disposed between the cover and the cap to form a fluid tight seal therebetween.

7. The inlet filter of claim 1 wherein the cover is transparent.

8. The inlet filter of claim 1 wherein the cover is a non-load bearing element of the inlet filter.

9. The inlet filter of claim 1 wherein coupling the body to the cap provides structural integrity to the inlet filter.

10. The inlet filter of claim 1 further comprising a fitting rotatably attached to said cap, adjacent said inlet passageway.

11. An inlet for filter for filtering fluids prior to their introduction to a fluid dispensing device, comprising:
    a cap having a first coupling and defining an inlet passageway fluidly coupled to a first fluid passageway defined within the cap and in fluid communication with at least one outlet port adjacent the first coupling in a sidewall thereof, said first coupling constructed and arranged to divert fluid flow from said inlet passageway through said outlet port;
    a body comprising (i) a fitting coupleable to the fluid dispensing device, and (ii) a second coupling including an end directly coupleable to an end of the first coupling and a sidewall defining at least one inlet port fluidly coupled to a second fluid passageway operably disposed within the body between the fitting and the inlet port;
    a screen filter operably disposed over the second coupling and covering the inlet port;
    a transparent, non-load bearing cover operably disposed between the body and the cap to provide a fluid path between the outlet port and the inlet port so that fluid introduced into the inlet filter enters the first fluid passageway and exits through the outlet port, passes along an interior of the cover, through the screen filter, where it enters the inlet port, passes through the second fluid passageway and out of the fitting into the fluid dispensing device.

12. The inlet filter of claim 11 wherein the cap and body are formed from metal and the cover is formed from plastic.

13. The inlet filter of claim 11, further including:
    a first O-ring disposed between the cover and the cap to form a fluid tight seal; and
    a second O-ring disposed between the cover and the body to form a fluid tight seal.

14. The inlet filter of claim 11 further including:
    a bypass inlet port for introducing additional fluid into the inlet filter.

15. The inlet filter of claim 14 wherein the bypass inlet port is located on the body.

16. The inlet filter of claim 14 wherein the bypass inlet port is a threaded coupling.

17. The inlet filter of claim 11 wherein the first and second coupling are mating threaded members.

18. The inlet filter of claim 11 wherein the cap, the body and the cover are formed from plastic.

19. The inlet filter of claim 11 further comprising an attachment section operably attached to said cap and coupleable to the output of a fluid supply line.

20. The inlet filter of claim 11 further comprising a fitting operably attached to said body and coupleable to the fluid dispensing device.

21. The inlet filter of claim 11 wherein said cap is of unitary construction.

22. The inlet filter of claim 11 wherein said body is of unitary construction.

23. An inlet filter comprising:
    a cap of unitary construction, having a first coupling, and defining a first fluid passageway operably disposed within the cap, fluidly connected with at least one outlet port in a sidewall of said first coupling;
    a body of unitary construction, having a second coupling directly coupleable to an end of the first coupling to form a union therebetween, said second coupling defining at least one inlet port in a sidewall thereof fluidly coupled to a second fluid passageway operably disposed within the body and in fluid communication with an outlet passageway;
    a substantially cylindrical filtering element removably disposed between the inlet port and the outlet port; and
    a cylindrical cover substantially concentric with and surrounding said filtering element and said union, said cover held axially in place at one end by a flange integral with said body and at an opposite end by a flange integral with said cap;
    a first O-ring operably disposed between said cover and said cap thereby preventing fluid from flowing between said cover and said flange integral with said cap;
    a second O-ring operably disposed between said cover and said body, thereby preventing fluid from flowing between said cover and said flange integral with said body;

whereby said union defines adjacent limiting ends of said first and second fluid passageways.

24. The inlet filter of claim 23 further comprising a threaded male connector integral with said body and defining an outlet fluid passageway in fluid communication with said second fluid passageway.

25. The inlet filter of claim 23 further comprising a threaded female fitting rotatably attached to said cap and defining an inlet fluid passageway in fluid communication with said first fluid passageway.

26. The inlet filter of claim 23 further comprising a threaded male connector integral with said cap and defining an inlet fluid passageway in fluid communication with said first fluid passageway.

27. The inlet filter of claim 23 further comprising a threaded female fitting rotatably attached to said body and defining said outlet fluid passageway in fluid communication with said second fluid passageway.

* * * * *

UNITED STATES PATENT AND TRADEMARK OFFICE
CERTIFICATE OF CORRECTION

PATENT NO.    : 6,322,696 B1
DATED         : November 27, 2001
INVENTOR(S)   : Sheila S. McKee and Mark B. Kirschenman It is certified that error appears in the above-identified patent and that said Letters Patent is hereby corrected as shown below:

Column 2,
Line 66, delete "though" and insert -- through --

Column 5,
Line 16, delete "that than" and insert -- than the --
Line 27, delete "cover 36" and insert -- cover 34 -- (both instances)
Line 31, delete "cover 36" and insert -- cover 34 --

Column 7,
Line 51, delete "for" after the word "inlet"

Signed and Sealed this

Seventh Day of May, 2002

Attest:

JAMES E. ROGAN
*Attesting Officer*   *Director of the United States Patent and Trademark Office*